United States Patent
Chen et al.

(10) Patent No.: US 9,290,682 B2
(45) Date of Patent: Mar. 22, 2016

(54) PRESSURE-SENSITIVE ADHESIVE COMPOSITION

(71) Applicant: 3M INNOVATIVE PROPERTIES COMPANY, St. Paul, MN (US)

(72) Inventors: Zhong Chen, Woodbury, MN (US); Kelly S. Anderson, Houlton, WI (US); Jingjing Ma, Cottage Grove, MN (US); Emilie L. Rexeisen, Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/345,312

(22) PCT Filed: Nov. 12, 2012

(86) PCT No.: PCT/US2012/064640
§ 371 (c)(1),
(2) Date: Mar. 17, 2014

(87) PCT Pub. No.: WO2013/074446
PCT Pub. Date: May 23, 2013

(65) Prior Publication Data
US 2015/0044457 A1 Feb. 12, 2015

Related U.S. Application Data

(60) Provisional application No. 61/561,459, filed on Nov. 18, 2011.

(51) Int. Cl.
*C09J 133/08* (2006.01)
*C09J 133/10* (2006.01)
*C09J 11/08* (2006.01)

(52) U.S. Cl.
CPC ............. *C09J 133/08* (2013.01); *C09J 133/10* (2013.01); *C09J 11/08* (2013.01); *Y10T 428/2891* (2015.01)

(58) Field of Classification Search
None
See application file for complete search history.

(56) References Cited

U.S. PATENT DOCUMENTS

| | | |
|---|---|---|
| 3,691,140 A | 9/1972 | Silver |
| 4,152,189 A | 5/1979 | Guerin |
| 4,166,152 A | 8/1979 | Baker |
| 4,391,687 A | 7/1983 | Vesley |
| 4,503,169 A | 3/1985 | Randklev |
| 4,619,979 A | 10/1986 | Kotnour |
| 4,636,432 A | 1/1987 | Shibano |
| 4,656,218 A | 4/1987 | Kinoshita |
| 4,737,559 A | 4/1988 | Kellen |
| 4,843,134 A | 6/1989 | Kotnour |
| 5,045,569 A | 9/1991 | Delgado |
| 5,225,470 A | 7/1993 | Mancinelli |
| 5,602,221 A | 2/1997 | Bennett |
| 5,637,646 A | 6/1997 | Ellis |
| 5,656,698 A * | 8/1997 | Hentges ............... C08F 8/04 525/327.4 |
| 5,753,768 A | 5/1998 | Ellis |
| 5,804,610 A | 9/1998 | Hamer |
| 5,840,783 A * | 11/1998 | Momchilovich et al. ...... 522/112 |
| 5,986,011 A | 11/1999 | Ellis |
| 6,448,339 B1 | 9/2002 | Tomita |
| 6,783,850 B2 * | 8/2004 | Takizawa ........... C08G 18/6254 428/355 AC |
| 6,939,911 B2 | 9/2005 | Tosaki |
| 7,090,721 B2 | 8/2006 | Craig |
| 7,090,722 B2 | 8/2006 | Budd |
| 7,156,911 B2 | 1/2007 | Kangas |
| 7,649,029 B2 | 1/2010 | Kolb |
| 7,927,703 B2 * | 4/2011 | Xia ........................ B32B 7/12 156/327 |
| 8,137,807 B2 | 3/2012 | Clapper |
| 2004/0202879 A1 | 10/2004 | Xia |
| 2008/0113094 A1 | 5/2008 | Casper |
| 2008/0281047 A1 | 11/2008 | Kishioka |
| 2010/0136321 A1 | 6/2010 | Uesugi |
| 2010/0182679 A1* | 7/2010 | Han ..................... C09J 133/14 359/359 |
| 2010/0323197 A1 | 12/2010 | Maeda |
| 2011/0070434 A1 | 3/2011 | Hirose |
| 2011/0104486 A1 | 5/2011 | Ma |
| 2011/0250433 A1 | 10/2011 | Inokuchi |
| 2011/0251351 A1 | 10/2011 | Inokuchi |
| 2012/0184680 A1 | 7/2012 | Akiyama |

FOREIGN PATENT DOCUMENTS

| | | |
|---|---|---|
| WO | WO 91-18070 | 11/1991 |
| WO | WO 95-13331 | 5/1995 |
| WO | WO 2011-038202 | 3/2011 |
| WO | WO 2011-075501 | 6/2011 |
| WO | WO 2012-082448 | 6/2012 |

OTHER PUBLICATIONS

Fox, "The Spreading of Liquids on Low Energy Surfaces. I. Polytetrafluoroethylene", Journal of Colloid. Science, Dec. 1950, vol. 5, No. 6, pp. 514-531.
Mark, "Surface and Interfacial properties", Physical Properties of Polymers Handbook, 1011-1019 (2007).
Rauwendaal, "Mixing in Single-Screw Extruders", Mixing in Polymer Processing, 129; 176-177, 185-186 (1991).
Zisman, "Relation of Equilibrium Contact Angle to Liquid and Solid Constitution," Contact Angle, Wettability, and Adhesion, 1-51 (1964).
International Search Report for PCT International Application No. PCT/US2012/064640 Mailed on Apr. 15, 2013, 3 pages.

* cited by examiner

*Primary Examiner* — Satya Sastri
(74) *Attorney, Agent, or Firm* — Kent S. Kokko

(57) ABSTRACT

Disclosed is an adhesive composition comprising a low $T_g$ (meth)acrylate copolymer component, a high $T_g$ (meth)acrylate copolymer component, and a hydrogenated hydrocarbon tackifier. This disclosure provides a pressure-sensitive adhesive and pressure-sensitive adhesive articles that are particularly useful in the bonding of low surface energy (LSE) substrates.

17 Claims, No Drawings

PRESSURE-SENSITIVE ADHESIVE COMPOSITION

CROSS REFERENCE TO RELATED APPLICATIONS

This application is a national stage filing under 35 U.S.C. 371 of PCT/US2012/064640, filed Nov. 12, 2012, which claims priority to Provisional Application No. 61/561459, filed Nov. 18, 2011, the disclosure of which is incorporated by reference in its/their entirety herein.

TECHNICAL FIELD OF THE INVENTION

This invention relates to pressure-sensitive adhesives and tape articles prepared therefrom. The tapes are characterized by exhibiting an overall balance of adhesive and cohesive characteristics and exceptional adhesion to low surface energy substrates.

BACKGROUND OF THE INVENTION

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

SUMMARY

The present disclosure provides an adhesive composition comprising a low $T_g$ (meth)acrylate copolymer component, a high $T_g$ (meth)acrylate copolymer component, and preferably a hydrogenated hydrocarbon tackifier. This disclosure provides a pressure-sensitive adhesive and pressure-sensitive adhesive articles that are particularly useful in the bonding of low surface energy (LSE) substrates, and exhibit high peel values, particularly at elevated temperatures.

The low $T_g$ acrylate copolymer component, which may be a solution copolymer or a syrup copolymer, and has a $T_g$ of ≤20° C., comprises:
i. $C_1$-$C_{18}$ (meth)acrylic acid ester monomer units;
ii. acid-functional ethylenically unsaturated monomer units;
iii. optional non-acid functional, ethylenically unsaturated polar monomer units;
iv. optional vinyl monomer units; and
v. optional multifunctional (meth)acrylate monomer units.

The high $T_g$ acrylate copolymer has a $M_w$≥20 k, a $T_g$ of ≥50° C., and comprises:
i) high $T_g$ (meth)acrylic acid ester monomer units;
ii) optional acid functional ethylenically unsaturated monomer units;
iii) optional low $T_g$ (meth)acrylic acid ester monomer units;
iv) optional non-acid functional, ethylenically unsaturated polar monomer units;
v) optional vinyl monomer units.

In this application, "syrup (co)polymer" refers to a solution of a solute (co)polymer in one or more solvent monomers, the solution having a viscosity of from 500 to 10,000 cPs (centipoise) at 22° C., and "solution (co)polymer" refers to a solution of a solute (co)polymer in one or more organic solvents.

The pressure-sensitive adhesives of this disclosure provide the desired balance of tack, peel adhesion, and shear holding power, and further conform to the Dahlquist criteria; i.e. the modulus of the adhesive at the application temperature, typically room temperature, is less than 3×10⁶ dynes/cm at a frequency of 1 Hz. The adhesives of the present disclosure are particularly useful for forming strong bonds to low surface energy (LSE) substrates, and further exhibit exceptional adhesion at elevated temperatures on these substrates.

As used herein, "alkyl" includes straight-chained, branched, and cyclic alkyl groups and includes both unsubstituted and substituted alkyl groups. Unless otherwise indicated, the alkyl groups generally contain from 1 to 18 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

Adhesion to low surface energy materials is a long-felt need in the art of acrylic adhesive formulation. While there are adhesives that provide acceptable levels of performance, there is an ongoing need for more options to meet this demand. Furthermore, a pressure sensitive adhesive is typically formulated for adhesion properties at or near room temperature.

When a usage temperature well exceeds its $T_g$, the adhesion of a typical acrylic adhesive drops rapidly. Therefore, there is also a need for acrylic adhesive compositions that can maintain sufficient adhesion even at elevated temperatures (<100° C.) for many demanding applications, for examples in the electronic, automotive, and industrial markets. The present inventors have discovered that by blending high Tg acrylic copolymers into a low Tg copolymer matrix to form a weakly separating phase morphology, surprising improvements in overall adhesion to LSE substrates, especially at elevated temperatures, were achieved.

DETAILED DESCRIPTION

The adhesive compositions of this disclosure comprise, in part, a low $T_g$ copolymer component, which in preferred embodiments may be a solution copolymer or a syrup copolymer. The $T_g$ of the copolymer is ≤20° C., preferably ≤0° C.

The (meth)acrylate ester monomer useful in preparing the acid functional (meth)acrylate adhesive copolymer is a monomeric (meth)acrylic ester of a non-tertiary alcohol, which alcohol contains from 1 to 18 carbon atoms and preferably an average of from 4 to 12 carbon atoms. A mixture of such monomers may be used.

Examples of monomers suitable for use as the (meth)acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable.

In some embodiments, the preferred (meth)acrylate ester monomer is the ester of (meth)acrylic acid with an alcohol derived from a renewable source, such as 2-octanol, citronellol, dihydrocitronellol.

In some embodiments a portion of the above described (meth)acrylate esters may be substituted with (meth)acrylates derived from 2-alkyl alkanols (Guerbet alcohols) as described in Applicant's copending U.S. Pat. No. 8,137,807 (Lewandowski et al.), incorporated herein by reference.

The (meth)acrylate ester monomer is present in an amount of 85 to 99.5 parts by weight based on 100 parts total monomer content used to prepare the low $T_g$ copolymer. Preferably (meth)acrylate ester monomer is present in an amount of 95 to 99 parts by weight based on 100 parts total monomer content of the low $T_g$ copolymer.

The polymer further comprises an acid functional monomer, where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl(meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 0.5 to 15 parts by weight, preferably 1 to 15 parts by weight, most preferably 1 to 5 parts by weight, based on 100 parts by weight total monomer of the low $T_g$ copolymer.

The polar monomers useful in preparing the copolymer are both somewhat oil soluble and water soluble, resulting in a distribution of the polar monomer between the aqueous and oil phases in an emulsion polymerization. As used herein the term "polar monomers" are exclusive of acid functional monomers.

Representative examples of suitable polar monomers include but are not limited to 2-hydroxyethyl(meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl)(meth)acrylates including 2-(2-ethoxyethoxy)ethyl(meth)acrylate, 2-ethoxyethyl(meth)acrylate, 2-methoxyethoxyethyl(meth)acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl(meth)acrylate and N-vinylpyrrolidinone. The polar monomer may be present in amounts of 0 to 10 parts by weight, preferably 0.5 to 5 parts by weight, based on 100 parts by weight total monomer of the low $T_g$ copolymer.

When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight total monomer of the low $T_g$ copolymer.

In order to increase cohesive strength of the coated adhesive composition, a multifunctional (meth)acrylate may be incorporated into the blend of polymerizable monomers. Multifunctional acrylates are particularly useful for emulsion or syrup polymerization. Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol)di (meth)acrylates, polybutadiene di(meth)acrylate, polyurethane di(meth)acrylates, and propoxylated glycerin tri(meth) acrylate, and mixtures thereof. The amount and identity of multifunctional (meth)acrylate is tailored depending upon application of the adhesive composition. Typically, the multifunctional (meth)acrylate is present in amounts less than 5 parts based on total dry weight of adhesive composition. More specifically, the crosslinker may be present in amounts from 0.01 to 5 parts, preferably 0.05 to 1 parts, based on 100 parts total monomers of the low $T_g$ copolymer.

In such embodiments, the copolymer of the low $T_g$ copolymer component may comprise:
i. 85 to 99.5 parts by weight of an (meth)acrylic acid ester of non-tertiary alcohol;
ii. 0.5 to 15 parts by weight of an acid-functional ethylenically unsaturated monomer;
iii. 0 to 10 parts by weight of a non-acid functional, ethylenically unsaturated polar monomer;
iv. 0 to 5 parts vinyl monomer; and
v. 0 to 5 parts of a multifunctional (meth)acrylate; based on 100 parts by weight total monomers of the low $T_g$ copolymer.

In certain preferred embodiments, the low $T_g$ copolymers may contain high $T_g$ monomers having glass transition temperatures of >50° C., as a function of the homopolymer of said high $T_g$ monomers. It has been found that the incorporation of small amounts of high $T_g$ monomers in the low $T_g$ copolymer component improves the compatibility and stabilize the microphase morphology between the low- and high $T_g$ copolymer components, particularly when the high Tg monomer is common to both copolymer components.

Suitable high $T_g$ monomers are (meth)acrylate esters and are described in more detail below. The low $T_g$ copolymer may contain amounts of copolymerized high $T_g$ monomers such that the $T_g$ of the copolymer is ≤20° C., preferably ≤0° C., as estimated by the Fox Equation. Generally, the copolymer may contain 1-20 wt. %, preferably 1-10 wt. % in the low $T_g$ copolymer component. The high $T_g$ monomers of the low $T_g$ copolymer may be incorporated in any manner. They may be part of the monomer mixture used in the preparation, whether by syrup, solvent or neat polymerization. Where such high $T_g$ monomers are included, the low $T_g$ copolymer may comprise:

ia. 65 to 98.5 parts by weight of an (meth)acrylic acid ester of non-tertiary alcohol;
ib 1 to 20 parts by weight of high Tg (meth)acrylic acid ester monomers;
ii. 0.5 to 15 parts by weight of an acid-functional ethylenically unsaturated monomer;
iii. 0 to 10 parts by weight of a non-acid functional, ethylenically unsaturated polar monomer;
iv. 0 to 5 parts vinyl monomer; and
v. 0 to 5 parts of a multifunctional (meth)acrylate;
based on 100 parts by weight total monomers of the low $T_g$ copolymer.

The low $T_g$ copolymers may be prepared by any conventional free radical polymerization method, including solution, radiation, bulk, dispersion, emulsion, solventless, and suspension processes. The resulting adhesive (co)polymers may be random or block (co)polymers. Preferably, the low $T_g$ copolymer component is generally prepared as either a solution or syrup copolymer composition.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 24 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

A syrup polymer technique comprises partially polymerizing monomers to produce a syrup polymer comprising the low $T_g$ (meth)acrylate copolymer and unpolymerized monomers. The syrup polymer composition is polymerized to a useful coating viscosity, which may be coated onto a substrate (such as a tape backing) and further polymerized. Partial polymerization provides a coatable solution of the acid functional (meth)acrylate solute copolymer in one or more solvent monomers. When high $T_g$ monomers are included, the initial monomer mixture may include the high $T_g$ monomers, and/or the high $T_g$ monomers may be added to the syrup polymer composition. In such embodiments, the monomer mixture may be combined and partially polymerized to a suitable viscosity, then addition high $T_g$ monomers added.

The polymerizations may be conducted in the presence of, or preferably in the absence of, suitable solvents such as ethyl acetate, toluene and tetrahydrofuran which are unreactive with the functional groups of the components of the syrup polymer.

Polymerization can be accomplished by exposing the syrup polymer composition to energy in the presence of a photoinitiator. Energy activated initiators may be unnecessary where, for example, ionizing radiation is used to initiate polymerization. These photoinitiators can be employed in concentrations ranging from about 0.0001 to about 3.0 pbw, preferably from about 0.0001 to about 1.0 pbw, and more preferably from about 0.005 to about 0.5 pbw, per 100 pbw of the total monomer of the low $T_g$ syrup copolymer.

A preferred method of preparation of the coatable syrup polymer is photoinitiated free radical polymerization. Advantages of the photopolymerization method are that 1) heating the monomer solution is unnecessary and 2) photoinitiation is stopped completely when the activating light source is turned off. Polymerization to achieve a coatable viscosity may be conducted such that the conversion of monomers to polymer is up to about 30%. Polymerization can be terminated when the desired conversion and viscosity have been achieved by removing the light source and by bubbling air (oxygen) into the solution to quench propagating free radicals.

The solute (co)polymer(s) may be prepared conventionally in a non-monomeric solvent and advanced to high conversion (degree of polymerization). When solvent (monomeric or non-monomeric) is used, the solvent may be removed (for example by vacuum distillation) either before or after formation of the syrup polymer. While an acceptable method, this procedure involving a highly converted functional polymer is not preferred because an additional solvent removal step is required, another material may be required (the non-monomeric solvent), and dissolution of the high molecular weight, highly converted solute polymer in the monomer mixture may require a significant period of time.

Useful photoinitiators include benzoin ethers such as benzoin methyl ether and benzoin isopropyl ether; substituted acetophenones such as 2,2-dimethoxyacetophenone, available as Irgacure™ 651 photoinitiator (BASF, Ludwigshafen, Germany), 2,2 dimethoxy-2-phenyl-1-phenylethanone, available as Esacure™ KB-1 photoinitiator (Sartomer Co.; West Chester, Pa.), and dimethoxyhydroxyacetophenone; substituted α-ketols such as 2-methyl-2-hydroxy propiophenone; aromatic sulfonyl chlorides such as 2-naphthalenesulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. Additional photoinitiator can be added to the mixture to be coated after the copolymer has been formed, i.e., photoinitiator can be added to the syrup polymer mixture.

The syrup polymer composition and the photoinitiator may be irradiated with activating UV radiation to polymerize the monomer component(s). UV light sources can be of two types: 1) relatively low light intensity sources such as backlights which provide generally 10 mW/cm$^2$ or less (as measured in accordance with procedures approved by the United States National Institute of Standards and Technology as, for example, with a Uvimap™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm$^2$, preferably between 15 and 450 mW/cm$^2$. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$. Such photoinitiators preferably are present in an amount of from 0.1 to 1.0 pbw per 100 pbw of the syrup polymer composition.

The degree of conversion (of monomers to copolymer) can be monitored during the irradiation by measuring the index of refraction of the polymerizing. Useful coating viscosities are achieved with conversions (i.e. the percentage of available monomer polymerized) in the range of up to 30%, preferably 2-20%, more preferably from 5-15%, and most preferably from 7-12%. The molecular weight (weight average) of the solute polymer(s) is at least 100,000, preferably at least 250,000, more preferably at least 500,000.

It will be understood that a syrup polymerization method will produce a "dead polymer" in the initial free radical polymerization; i.e. a fully polymerized, not free-radically polymerizable polymer. Subsequently the solvent monomers do not free-radically polymerize onto the extant solute copolymer. Upon compounding the syrup polymer, further exposure to UV initiates free radical polymerization of the solvent monomers to produce a distinct copolymer. The syrup method provides advantages over solvent or solution polymerization methods; the syrup method yielding higher molecular weights. These higher molecular weights increase the amount of chain entanglements, thus increasing cohesive strength. Also, the distance between cross-links can be greater with high molecular syrup polymer, which allows for increased wet-out onto a surface.

The adhesive compositions of this disclosure comprise, in part, a high $T_g$ (co)polymer component, having $M_w \geq 20$ k, preferably $\geq 30$ k, and less than 100 k, preferably less than 75 k. The high $T_g$ (co)polymer has a $T_g \geq 50°$ C., preferably $\geq 75°$ C. The high $T_g$ copolymer comprises:

i) high $T_g$ (meth)acrylic acid ester monomer units;
ii) optional acid functional ethylenically unsaturated monomer units;
iii) optional low $T_g$ (meth)acrylic acid ester monomer units;
iv) optional non-acid functional, ethylenically unsaturated polar monomer units; and
v) optional vinyl monomer units.

The high $T_g$ copolymer may comprise 100 wt. % high $T_g$ monomer(s). In other embodiments, the high $T_g$ copolymer may comprise the additional monomer units, as described for the low $T_g$ copolymer (supra), each in amounts such that the $T_g$ of the resulting copolymer is at least 50° C., preferably at least 75° C., as estimated by the Fox equation.

Thus the high $T_g$ copolymer may comprise:

i) up to 100 parts by weight of high $T_g$ (meth)acrylic acid ester monomer units;
ii) 0 to 15, preferably 1 to 5 parts by weight of acid functional ethylenically unsaturated monomer units;
iii) 0 to 50, preferably 1 to 25 parts by weight of optional low $T_g$ (meth)acrylic acid ester monomer units;
iv) 0 to 10, preferably 1 to 5 parts by weight of optional a non-acid functional, ethylenically unsaturated polar monomer units; and
v) 0 to 5, preferably 1 to 5 parts by weight of optional vinyl monomer units.

It is desirable for the (meth)acrylic acid ester (co)polymer to include a high $T_g$ monomer units, such that the high $T_g$ copolymer has a $T_g$ of $\geq 50°$ C., and preferably $\geq 75°$ C., as estimated by the Fox Equation.

Suitable high $T_g$ monomers include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

Suitable low $T_g$ monomers include have one ethylenically unsaturated group and a glass transition temperature of less than 0° C. (as a function of the homopolymer), which are suitable in the present invention include, for example, n-butyl acrylate, isobutyl acrylate, hexyl acrylate, 2-ethyl-hexylacrylate, isooctylacrylate, caprolactoneacrylate, isodecylacrylate, tridecylacrylate, laurylmethacrylate, methoxy-polyethylenglycol-monomethacrylate, laurylacrylate, tetrahydrofurfurylacrylate, ethoxy-ethoxyethyl acrylate and ethoxylated-nonylacrylate. Especially preferred are 2-ethyl-hexylacrylate, ethoxy-ethoxyethyl acrylate, tridecylacrylate and ethoxylated nonylacrylate.

Other monomers may be used as described for the low $T_g$ copolymer (supra).

The high $T_g$ (co)polymers herein may be prepared by any conventional free radical polymerization method, including solution, radiation, bulk, dispersion, emulsion, and suspension processes. The resulting adhesive (co)polymers may be random or block (co)polymers.

The adhesive copolymers may be prepared via suspension polymerizations as disclosed in U.S. Pat. No. 3,691,140 (Silver); U.S. Pat. No. 4,166,152 (Baker et al.); U.S. Pat. No. 4,636,432 (Shibano et al); U.S. Pat. No. 4,656,218 (Kinoshita); and U.S. Pat. No. 5,045,569 (Delgado).

Polymerization via emulsion techniques may require the presence of an emulsifier (which may also be called an emulsifying agent or a surfactant). Useful emulsifiers for the present invention include those selected from the group consisting of anionic surfactants, cationic surfactants, nonionic surfactants, and mixtures thereof. Preferably, an emulsion polymerization is carried out in the presence of anionic surfactant(s). A useful range of surfactant concentration is from about 0.5 to about 8 weight percent, preferably from about 1 to about 5 weight percent, based on the total weight of all monomers of the emulsion pressure-sensitive adhesive.

Alternatively, the copolymers can be polymerized by techniques including, but not limited to, the conventional techniques of solvent polymerization, dispersion polymerization, and solventless bulk polymerization. The monomer mixture may comprise a polymerization initiator, especially a thermal initiator or a photoinitiator of a type and in an amount effective to polymerize the comonomers.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 20 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

In a typical photopolymerization method, a monomer mixture may be irradiated with ultraviolet (UV) rays in the presence of a photopolymerization initiator (i.e., photoinitiators). Preferred photoinitiators are those available under the trade designations IRGACURE™ and DAROCUR™ from BASF and include 1-hydroxy cyclohexyl phenyl ketone (IRGACURE™ 184), 2,2-dimethoxy-1,2-diphenylethan-1-one (IRGACURE 651), bis(2,4,6-trimethylbenzoyl)phenylphosphineoxide (IRGACURE™ 819), 1-[4-(2-hydroxyethoxy)phenyl]-2-hydroxy-2-methyl-1-propane-1-one (IRGACURE™ 2959), 2-benzyl-2-dimethylamino-1-(4-morpholinophenyl)butanone (IRGACURE™ 369), 2-methyl-1-[4-(methylthio)phenyl]-2-morpholinopropan-1-one (IRGACURE™ 907), and 2-hydroxy-2-methyl-1-phenyl propan-1-one (DAROCUR™ 1173). Particularly preferred photoinitiators are IRGACURE™ 819, 651, 184 and 2959.

Solventless polymerization methods, such as the continuous free radical polymerization method described in U.S. Pat. Nos. 4,619,979 and 4,843,134 (Kotnour et al.); the essentially adiabatic polymerization methods using a batch reactor described in U.S. Pat. No. 5,637,646 (Ellis); and, the methods described for polymerizing packaged pre-adhesive compositions described in U.S. Pat. No. 5,804,610 (Hamer et al.) may also be utilized to prepare the polymers.

Water-soluble and oil-soluble initiators useful in preparing the high $T_g$ (co)polymers used in the present invention are initiators that, on exposure to heat, generate free-radicals which initiate (co)polymerization of the monomer mixture. Water-soluble initiators are preferred for preparing the (meth)acrylate polymers by emulsion polymerization. Suitable water-soluble initiators include but are not limited to those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis(4-cyanopentanoic acid) and its soluble salts (e.g., sodium, potassium). The preferred water-soluble initiator is potassium persulfate. Suitable oil-soluble initiators include but are not limited to those selected from the group consisting of azo compounds such as VAZO™ 64 (2,2'-azobis(isobutyronitrile)) and VAZO™ 52 (2,2'-azobis(2,4-dimethylpentanenitrile)), both available from E.I. du Pont de Nemours Co., peroxides such as benzoyl peroxide and lauroyl peroxide, and mixtures thereof. The preferred oil-soluble thermal initiator is (2,2'-azobis(isobutyronitrile)). When used, initiators may comprise from about 0.05 to about 1 part by weight, preferably about 0.1 to about 0.5 part by weight based on 100 parts by weight of monomer components in the pressure-sensitive adhesive.

For both of the high and low $T_g$ copolymers, a useful predictor of interpolymer $T_g$ for specific combinations of various monomers can be computed by application of Fox Equation: $1/T_g = \Sigma W_i/T_g i$. In this equation, $T_g$ is the glass transition temperature of the mixture, Wi is the weight fraction of component i in the mixture, and $T_g i$ is the glass transition temperature of component i, and all glass transition temperatures are in Kelvin (K). As used herein the term "high Tg monomer" refers to a monomer, which when homopolymerized, produce a (meth)acryloyl copolymer having a $T_g$ of ≥50° C. The incorporation of the high $T_g$ monomer to the high $T_g$ copolymer is sufficient to raise the glass transition temperature of the resulting copolymer to 50° C., preferably ≥75° C., more preferably ≥100° C., as calculated using the Fox Equation. Alternatively, the glass transition temperature can be measured in a variety of known ways, including, e.g., through differential scanning calorimetry (DSC).

If desired, a chain transfer agent may be added to the monomer mixture of either of the low- or high Tg (co)polymers to produce a (co)polymer having the desired molecular weight. A chain transfer is preferably used in the preparation of the high $T_g$ (co)polymer. It has been observed that when the molecular weight of the high $T_g$ (co)polymer is less than 20 k, the peel performance at elevated temperatures is reduced. Further, when the $M_w$ is greater than about 100 k, the immiscibility of the components is such that the tack of the composition is reduced.

Examples of useful chain transfer agents include but are not limited to those selected from the group consisting of carbon tetrabromide, alcohols, mercaptans, and mixtures thereof. When present, the preferred chain transfer agents are isooctylthioglycolate and carbon tetrabromide. The chain transfer agent may be used in amounts such that the high $T_g$ (co)polymer has a $M_w$ of greater than 20 k, and preferable less than 100 k. The monomer mixture may further comprise up to about 5 parts by weight of a chain transfer agent, typically about 0.01 to about 5 parts by weight, if used, preferably about 0.5 parts by weight to about 3 parts by weight, based upon 100 parts by weight of the total monomer mixture.

In order to increase cohesive strength of the pressure-sensitive adhesives, a crosslinking additive may be added to the adhesive composition—the combination of the high- and low Tg (co)polymers. Two main types of crosslinking additives are exemplary. The first crosslinking additive is a thermal crosslinking additive such as multifunctional aziridine, isocyanate and epoxy. One example of aziridine crosslinker is 1,1'-isophthaloyl-bis(2-methylaziridine (CAS No. 7652-64-4). Such chemical crosslinkers can be added into PSAs after polymerization and activated by heat during oven drying of the coated adhesive. Although polyfunctional (meth)acrylates may be included in the low $T_g$ copolymer component and may function as crosslinking agents, additional crosslinking agents may be added.

In another embodiment, chemical crosslinkers, which rely upon free radicals to carry out the crosslinking reaction, may be employed. Reagents such as, for example, peroxides serve as a source of free radicals. When heated sufficiently, these precursors will generate free radicals that bring about a crosslinking reaction of the polymer. A common free radical generating reagent is benzoyl peroxide. Free radical generators are required only in small quantities, but generally require higher temperatures to complete a crosslinking reaction than those required for the bisamide and isocyanate reagents.

The second type of crosslinking additive is a photosensitive crosslinker, which is activated by high intensity ultraviolet (UV) light. Two common photosensitive crosslinkers used for acrylic PSAs are benzophenone and copolymerizable aromatic ketone monomers as described in U.S. Pat. No. 4,737,559 (Kellen et al.) Another photocrosslinker, which can be post-added to the solution or syrup copolymer and activated by UV light is a triazine, for example, 2,4-bis(trichloromethyl)-6-(4-methoxy-phenyl)-s-triazine. These crosslinkers are activated by In some embodiments, multifunctional acrylates may be used to increase the cohesive strength. Multifunctional acrylates are particularly useful for emulsion polymerization. Examples of useful multifunctional acrylate crosslinking agents include, but are not limited to, diacrylates, triacrylates, and tetraacrylates, such as 1,6-hexanediol diacrylate, poly(ethylene glycol)diacrylates, polybutadiene diacrylate, polyurethane diacrylates, and propoxylated glycerin triacrylate, and mixtures thereof.

Hydrolyzable, free-radically copolymerizable crosslinkers, such as monoethylenically unsaturated mono-, di-, and trialkoxy silane compounds including, but not limited to, methacryloxypropyltrimethoxysilane (available from Gelest, Inc., Tullytown, Pa.), vinyl dimethylethoxysilane, vinyl methyl diethoxysilane, vinyltriethoxysilane, vinyltrimethoxysilane, vinyltriphenoxysilane, and the like, are also useful crosslinking agents.

The amount and identity of the crosslinking agent is tailored depending upon application of the adhesive composition. Typically, the crosslinking agent is present in amounts less than 5 parts based on total dry weight of adhesive composition. More specifically, the crosslinker may be present in amounts from 0.01 to 5 parts, preferably 0.05 to 1 parts, based on 100 parts total monomers of the low $T_g$ copolymer.

Conventional acrylic adhesives do not adhere well to certain substrates, such as certain types of automotive paints and low energy surfaces (LSE). Efforts have been made to improve the adhesion of acrylic adhesives, i.e., develop more aggressive tack, to these types of surfaces; tackifying the base acrylic polymer is commonly practiced. Various types of tackifiers include phenol modified terpenes, resins such as polyvinyl cyclohexane and poly(t-butyl styrene), and rosin esters such as glycerol esters of rosin and pentaerythritol esters of rosin.

Due to the high solubility parameter of most conventional pressure-sensitive acrylic adhesives and the presence of specific potential interactions between these adhesives and many tackifiers, a limited selection of tackifiers is available to the formulator. As a class, hydrocarbon-based tackifiers, and especially hydrogenated hydrocarbon resins, have been considered unsuitable for use in acrylic adhesives formulations due to their nonpolar character.

However, Applicants have discovered that such hydrogenated hydrocarbon tackifiers may be effectively used in combination with the high- and low $T_g$ copolymers described supra. The tackifiers are used in amounts sufficient to strengthen the partial phase separation extant in the system. Surprisingly, Applicants have found that one can take advantage of the incompatibility of such tackifiers to produce pressure-sensitive adhesive composition. As result of the incompatibility, it is consequently observed that the glass transition of the adhesive composition is further broadened, relative to the combination of the high- and low $T_g$ copolymers, which consequentially further improves its overall adhesions on LSE substrates. On the other hand, if a compatible tackifier (those having good compatibility with the low $T_g$ acrylic polymers) is added to a high- and low $T_g$ copolymers blend, a significant drop in adhesion on LSE substrates is observed, and the advantageous effects from the phase separation of high- and low $T_g$ copolymers are lost.

Hydrogenated hydrocarbon tackifiers are traditionally used in more rubber-based adhesives rather than acrylic-based pressure sensitive adhesives. The hydrogenated hydrocarbon tackifiers are found to be particularly useful in the acrylate-based pressure sensitive adhesives for low surface energy substrates disclosed herein. Exemplary hydrogenated hydrocarbon tackifiers include $C_9$ and $C_5$ hydrogenated hydrocarbon tackifiers. Examples of $C_9$ hydrogenated hydrocarbon tackifiers include those sold under the trade designation: "REGALITE S-5100", "REGALITE R-7100", "REGALITE R-9100", "REGALITE R-1 125", "REGALITE S-7125", "REGALITE S-1 100", "REGALITE R-1090", "REGALREZ 6108", "REGALREZ 1085", "REGALREZ 1094", "REGALREZ 1 126", "REGALREZ 1 139", and "REGALREZ 3103", sold by Eastman Chemical Co., Middelburg, Netherlands; "PICCOTAC" and EASTOTAC" sold by Eastman Chemical Co.; "ARKON P-140", "ARON P-125", "ARKON P-115", "ARKON P-100", "ARKON P-90", "ARKON M-135", "ARKON M-1 15", "ARKON M-100", and "ARKON M-90" sold by Arakawa Chemical Inc., Chicago, Ill.; and "ESCOREZ 500" sold by Exxon Mobil Corp., Irving, Tex. Of particular interest are partially hydrogenated C9 hydrogenated tackifiers.

The hydrogenated hydrocarbon tackifiers are used in amounts of 0.1 to 20 parts by weight, preferably 1 to 15 parts by weight, more preferably 2 to 10 parts by weight, relative to 100 parts of the low- and high-$T_g$ (co)polymer components.

Other additives can be added in order to enhance the performance of the adhesive compositions. For example, leveling agents, ultraviolet light absorbers, hindered amine light stabilizers (HALS), oxygen inhibitors, wetting agents, rheology modifiers, defoamers, biocides, dyes and the like, can be included herein. All of these additives and the use thereof are well known in the art. It is understood that any of these compounds can be used so long as they do not deleteriously affect the adhesive properties.

Useful as additives to the present compositions are UV absorbers and hindered amine light stabilizers. UV absorbers and hindered amine light stabilizers act to diminish the harmful effects of UV radiation on the final cured product and thereby enhance the weatherability, or resistance to cracking, yellowing and delamination of the coating. A preferred hindered amine light stabilizer is bis(1,2,2,6,6-pentamethyl-4-piperidinyl) [3,5-bis(1,1-dimethylethyl-4-hydroxyphenyl)methyl]butylpropanedioate, available as Tinuvin™ 144, from BASF.

In some embodiments the composition may include filler. Such compositions may include at least 40 wt-%, more preferably at least 45 wt-%, and most preferably at least 50 wt-% filler, based on the total weight of the composition. In some embodiments the total amount of filler is at most 90 wt-%, preferably at most 80 wt-%, and more preferably at most 75 wt-% filler.

Fillers may be selected from one or more of a wide variety of materials, as known in the art, and include organic and inorganic filler. Inorganic filler particles include silica, submicron silica, zirconia, submicron zirconia, and non-vitreous microparticles of the type described in U.S. Pat. No. 4,503,169 (Randklev).

Filler components include nanosized silica particles, nanosized metal oxide particles, and combinations thereof. Nano-fillers are also described in U.S. Pat. No. 7,090,721 (Craig et al.), U.S. Pat. No. 7,090,722 (Budd et al.), U.S. Pat. No. 7,156,911 (Kangas et al.), and U.S. Pat. No. 7,649,029 (Kolb et al.).

Fillers may be either particulate or fibrous in nature. Particulate fillers may generally be defined as having a length to width ratio, or aspect ratio, of 20:1 or less, and more commonly 10:1 or less. Fibers can be defined as having aspect ratios greater than 20:1, or more commonly greater than 100:1. The shape of the particles can vary, ranging from spherical to ellipsoidal, or more planar such as flakes or discs. The macroscopic properties can be highly dependent on the shape of the filler particles, in particular the uniformity of the shape.

In some embodiments, the composition preferably comprise a nanoscopic particulate filler (i.e., a filler that comprises nanoparticles) having an average primary particle size of less than about 0.100 micrometers (i.e., microns), and more preferably less than 0.075 microns. As used herein, the term "primary particle size" refers to the size of a non-associated single particle. The average primary particle size can be determined by cutting a thin sample of hardened composition and measuring the particle diameter of about 50-100 particles using a transmission electron micrograph at a magnification of 300,000 and calculating the average. The filler can have a unimodal or polymodal (e.g., bimodal) particle size distribution. The nanoscopic particulate material typically has an average primary particle size of at least about 2 nanometers (nm), and preferably at least about 7 nm. Preferably, the nanoscopic particulate material has an average primary particle size of no greater than about 50 nm, and more preferably no greater than about 20 nm in size. The average surface area of such a filler is preferably at least about 20 square meters per gram ($m^2/g$), more preferably, at least about 50 $m^2/g$, and most preferably, at least about 100 $m^2/g$.

The adhesive composition is generally prepared by simple blending of the high- and low $T_g$ copolymer components with the tackifier. The polymers can be blended using several methods. The polymers can be blended by melt blending, solvent blending, or any suitable physical means. For example, the polymers can be melt blended by a method as described by Guerin et al. in U.S. Pat. No. 4,152,189, the disclosure of which is incorporated by reference herein. That is, all solvent (if used) is removed from each polymer by heating to a temperature of about 150° C. to about 175° C. at a reduced pressure Although melt blending is may be used, the adhesive blends of the present invention can also be processed using solvent blending. The acidic and basic polymers should be substantially soluble in the solvents used.

Physical blending devices that provide dispersive mixing, distributive mixing, or a combination of dispersive and distributive mixing are useful in preparing homogenous blends. Both batch and continuous methods of physical blending can be used. Examples of batch methods include BRABENDER (using a BRABENDER PREP CENTER, available from C. W. Brabender Instruments, Inc.; South Hackensack, N.J.) or BANBURY internal mixing and roll milling (using equipment available from FARREL COMPANY; Ansonia, Conn.). Examples of continuous methods include single screw extruding, twin screw extruding, disk extruding, reciprocating single screw extruding, and pin barrel single screw extruding. The continuous methods can include utilizing both distributive elements, such as cavity transfer elements (e.g., CTM, available from RAPRA Technology, Ltd.; Shrewsbury, England) and pin mixing elements, static mixing elements and dispersive elements (e.g., MADDOCK mixing elements or SAXTON mixing elements as described in "Mixing in Single-Screw Extruders," *Mixing in Polymer Processing*, edited by Chris Rauwendaal (Marcel Dekker Inc.: New York (1991), pp. 129, 176-177, and 185-186).

In embodiments where the low $T_g$ copolymer component is a solution copolymer, the low $T_g$ copolymer in a solvent is combined with the high $T_g$ (co)polymer and tackifier, mixed until homogenous, optionally coated, and dried to remove the solvent. When the low $T_g$ polymer component is a syrup copolymer, the syrup copolymer is combined with the high $T_g$ (co)polymer and tackifier, optional additional solvent monomer added, optionally coated and further polymerized.

The adhesive composition comprises at least 60 parts by weight, preferably 70, more preferably 80, of the low $T_g$ copolymer component, which may be in the form of a solution or a syrup copolymer; up to 40 parts by weight, preferably 5 to 40 parts by weight, of the high $T_g$ (co)polymer, with the sum of the high- and low Tg (co)polymer components 100 parts by weight. The tackifier is used in amounts sufficient to effect a partial phase separation of the components, and is generally used in amounts of 0.1 to 15 parts, preferably 0.1 to 10 parts by weight, relative to 100 parts by weight of the high- and low $T_g$ (co)polymer components.

It is observed that the combination of the low $T_g$ and high $T_g$ (co)polymer components yields a microphase-separated pressure-sensitive adhesive after curing or drying wherein the low $T_g$ copolymer is a continuous phase and the high $T_g$ (co)polymer exists as relatively uniformly-shaped inclusions ranging in size from about 0.01 micrometer to about 0.1 micrometer. The microphase domains are separated by a diffuse boundary caused by the intermixing of the partially incompatible components at the interfaces. It was also observed that the microphase separation broadens of the glass transition of the adhesive composition, relative to that of the composition where the high and low $T_g$ monomers were copolymerized in a random fashion. One estimate of this effect is the peak width at a fixed height (FHPW) at half of the peak intensity of the Tan Delta curve from a dynamic mechanical analysis.

Surprisingly, a pressure-sensitive adhesive tape having an adhesive layer comprising such a composition, and exhibiting microphase separation, provides substantial improvement in both peel adhesion and shear-holding capability on LSE substrates, when compared to compositions having a homogenous structure or those having macro-phase separation. In particular, exceptional improvements in adhesion properties at elevated temperatures were achieved. It was found that such advantageous phase-separating effects were dependent on the $M_w$ of the high $T_g$ (co)polymer. If $M_w$ of the high $T_g$ (co)polymer was less than 20K, the phase-separating effects were not sufficient to yield satisfactory adhesion performances at elevated temperatures.

A pressure-sensitive adhesive tape having an adhesive layer comprising such a composition, and exhibiting microphase separation, provides substantial improvement in both peel adhesion while maintaining acceptable values for other adhesive properties such as shear, when compared to compositions having a homogenous structure or those having macro-phase separation The adhesives of the present invention may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. Foam backings may be used. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably about 25 to 250 microns, are contemplated.

The adhesives of the present disclosure are particularly useful for forming strong bonds to low surface energy (LSE) substrates. As used herein, low surface energy substrates are those having a surface energy of less than about 45 dynes per centimeter, more typically less than about 40 dynes per centimeter, and most typically less than about 35 dynes per centimeter. Included among such materials are polypropylene, polyethylene (e.g., high density polyethylene or HDPE), polystyrene and poly(methyl methacrylate) (PMMA). Other substrates may also have properties of low surface energy due to a residue, such as an oil residue or a film such as a paint, being on the surface of the substrate. However, even though the present adhesive bonds well to low surface energy surfaces, the invention is not limited to being bonded to low surface energy substrates, as it has been found that the inventive adhesive can also bond well to higher surface energy substrates such as, for example, other plastics, ceramics (e.g., glass), metals.

Surface energy of solid surfaces may be determined from standard reference texts such as James E Mark, *Physical Properties of Polymers Handbook*, Chapter 59, Surface and Interfacial Properties, pp 1011-1019, or may be estimated using the procedures described by Fox, H. W. and Zisman, W. A., J. Colloid. Science, 5 (1950), p. 514; also Zisman, W. A., "Relation of Equilibrium Contact Angle to Liquid and Solid Constitution", Chapter 1 in Contact Angle, Wettability, and Adhesion, R. F. Gould, ed., American Chemical Society, Washington D.C., 1964.

The substrate is selected depending on the particular application in which it is to be used. For example, the adhesive can be applied to sheeting products, (e.g., decorative graphics and reflective products), label stock, and tape backings. Additionally, the adhesive may be applied directly onto a substrate such as an automotive panel, or a glass window so that another substrate or object can be attached to the panel or window.

The adhesive can also be provided in the form of a pressure-sensitive adhesive transfer tape in which at least one layer of the adhesive is disposed on a release liner for application to a permanent substrate at a later time. The adhesive can also be provided as a single coated or double coated tape in which the adhesive is disposed on a permanent backing.

Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion). Additional tape constructions include those described in U.S. Pat. No. 5,602,221 (Bennett et al.), incorporated herein by reference.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner.

EXAMPLES

All amounts are stated as weight percent unless otherwise indicated. Compositions listed in "phr" indicated parts per 100 parts of acrylic copolymer components, i.e., the acrylate monomers and a co-monomer, e.g., acrylic acid or N,N-dimethylacrylamide. As used herein, the term "polymer" is meant to be inclusive of homopolymers and co-polymers.

Materials Used in Examples and Suppliers
  AA—Acrylic acid; Alfa Aesar, Ward Hill, Mass.
  IBOA—Isobornyl acrylate; San Esters Corp., New York, N.Y.
  CD420—3,3,5-Trimethycyclohexyl acrylate; Sartomer, Warrington, Pa.
  nnDMA—N,N-Dimethylacrylamide; Alfa Aesar, Ward Hill, Mass.
  IOTG—Isooctylthioglycolate; Showa Denko Corp. Tokyo, Japan
  R1094—Regalrez 1094 fully hydrogenated hydrocarbon tackifier; Eastman Chemical, Kingsport, Tenn.
  TP7042—Sylvares TP 7042—Terpene Phenolics tackifier; Arizona Chemical, Jacksonville, Fla.
  B212—chemical crosslinker-(1,1'-isophthaloyl-bis(2-methylaziridine-((CAS number 7652-64-4) used in solution as a 5% by weight solution of solids in toluene.
  Triazine—(2,4,-bis(trichloromethyl)-6-(4-methoxyphenyl)-triazine prepared as described in U.S. Pat. No. 4,391,687

The following materials were obtained from BASF, Ludwigshafen, Germany
  2-EHA—2-ethylhexyl acrylate
  2-PHA—2-propylheptyl acrylate
  Irg651—Irgacure™ 651 photoinitiator The following materials were obtained from Arakawa Chemical (USA) Inc., Chicago, Ill.
  P140—Arkon P140 fully hydrogenated hydrocarbon tackifier
  M90—Arkon M90—partially hydrogenated hydrocarbon tackifier Test Methods 90° Angle Peel Adhesion Strength—Room Temperature (Approximately 23° C.)

The peel adhesion strength of an adhesive at a removal angle of 90° was performed according to the procedure described in the ASTM International standard D3330, Method F.

The test was conducted on an IMASS SP-2000 slip/peel tester (available from IMASS, Inc., Accord, Mass.) at a peel rate of 305 mm/minute (12 inches/minute).

Polypropylene (PP) test panels (5 cm×12.5 cm panels obtained from QUADRANT Engineering Plastics Products USA, Inc., Reading, Pa.) were prepared by wiping the panels with a tissue wetted with the Isopropyl Alcohol 8-10 times using hand pressure. The procedure was repeated two more times with clean tissues wetted with solvent. The cleaned panels were air dried.

Adhesive transfer tapes were prepared for testing by laminating the adhesive to 51 micron polyester film backings (HOSTAPHAN 3SAB available from Mitsubishi Polyester Film, Inc., Greer, S.C.) to produce a tape. Tapes were tested on the tape backing. A test specimen was prepared by rolling down a 1.3 cm×20 cm (½ in.×8 in.) strip of adhesive tape onto a PP test panel using 4 passes of a 2.0 kg (4.5 lb.) rubber roller. The test specimen was conditioned at one of the following conditions: A—24 hours at 23° C. and 50% relative humidity; B—40 minutes at 23° C. and 50% relative humidity; or C—7 days at 70° C. The average force, based on 2 replicates, required to peel the tape from the panel was measured in ounces and is expressed in Newtons/decimeter (N/dm). 90° Angle Peel Adhesion Strength—Elevated Temperatures—70° C. and 90° C.

Peel tests at elevated temperatures were conducted on an Instron® 5565 electromechanical materials testing machine equipped with an environmental chamber and a 90 degree peel fixture (Instron, Norwood, Mass.). A test specimen on a PP panel was prepared as described above for the peel adhesion test at room temperature and conditioned at 23° C. and 50% relative humidity for 24 hours unless otherwise specified. The test specimen was then mounted in the peel fixture in the Instron environmental chamber and conditioned for 30 min at the set temperature before conducting the test.

Heat Aged Adhesives or Tapes

Adhesive tapes with a release liner or adhesives between two liners were heat aged before laminating to a panel to prepare a test specimen. The adhesive or tape was placed between two glass panels and stored in an oven set at 70° C. for 7 days. Tapes or adhesives were cooled at 23° C. and 50% relative humidity for 2 hours before applying to a substrate for testing.

copolymer, the components in the amounts shown in Table 1 were mixed in amber bottles. Approximately 26 grams of the mixture were placed in a 18 cm×5 cm clear heat sealable poly(ethylene vinyl acetate) bag obtained under the trade designation VA-24 from Flint Hills Resources; Wichita, Kans. Air was forced out of the open end and the bag was sealed using an impulse heat sealer (Midwest Pacific Impulse Sealer; J. J. Elemer Corp.; St. Louis, Mo.). The sealed bags were immersed in a constant temperature water bath at 17° C. and irradiated with ultraviolet light (365 nm, 4 mW/cm$^2$) for eight minutes on each side to produce copolymers having the weight average molecular weights (Mw) shown in Table 1. Average molecular weights were measured using gel permeation chromatography.

TABLE 1

Compositions of high $T_g$ copolymers

| High Tg polymer | 2-EHA (phr) | IBOA (phr) | CD420 (phr) | AA (phr) | nnDMA (phr) | Irg651 (phr) | IOTG (phr) | Mw (Daltons) | *Tg (° C.) |
|---|---|---|---|---|---|---|---|---|---|
| HTG-1 | — | 97 | — | 3 | — | 1 | 1 | 25,600 | 94 |
| HTG-2 | — | 100 | — | — | — | 1 | 1 | 24,800 | 94 |
| HTG-3 | — | 100 | — | — | — | 1 | 1.5 | 16,400 | 94 |
| HTG-4 | — | 90 | — | — | 10 | 1 | 1 | 34,200 | 93 |
| HTG-5 | — | — | 97 | 3 | — | 1 | 1 | 27,100 | 128 |
| HTG-6 | — | 97 | — | 3 | — | 1 | 0.5 | 40,100 | 94 |
| HTG-7 | — | 97 | — | 3 | — | 1 | 5 | 8,400 | 94 |
| LTG | 76.3 | 20.7 | — | 3 | — | 1 | 1.5 | 25,000 | −38 |

*The Tg was calculated according to the Fox equation.

Static Shear Strength at 70° C.

The static shear strength of an adhesive was determined according to ASTM International standard, D3654, Procedure A, using a 500 g load inside an oven set at 70° C. A test specimen was prepared by laminating a 1.3 cm×2.5 cm (½ in.×1 in.) piece of adhesive or tape on a PP panel, cleaned as described above for the peel test. The time to failure, i.e., time for the weight to pull the adhesive away from panel in minutes was recorded. If no failure was observed after 10,000 minutes, the test was stopped and a value of 10,000+ minutes was recorded.

Molecular Weight Measurement

The weight average molecular weight of the polymers was determined using conventional gel permeation chromatography (GPC). The GPC apparatus, obtained from Waters Corporation (Milford, Mass.), included a high pressure liquid chromatography pump (Model 1515HPLC), an auto-sampler (Model 717), a UV detector (Model 2487), and a refractive index detector (Model 2410). The chromatograph was equipped with two 5 micron PLgel MIXED-D columns, available from Varian Inc. (Palo Alto, Calif.).

Polymeric solutions for testing were prepared by dissolving a polymer in tetrahydrofuran at a concentration of 2% by weight and filtering through a 0.2 micron polytetrafluoroethylene filter (available from VWR International; West Chester, Pa.). The resulting solution was injected into the GPC and eluted at a rate of 1 milliliter per minute through the columns maintained at 35° C. The system was calibrated with polystyrene standard using a linear least squares analysis to establish a calibration curve. The weight average molecular weight (Mw) was calculated for each sample from the calibration curve.

Preparation of High Tg Acrylic Copolymers (HTG-HTG7, LTG)

High Tg acrylic copolymers (HTG1-HTG7) and LTG were prepared having the compositions shown in Table 1. For each Preparation of Low $T_g$ Acrylic Syrups (S1-S5)

Low $T_g$ syrups were prepared by mixing the acrylate monomers and acrylic acid in the amounts shown in Table 2, with 0.08 phr of Irg651 in clear glass bottles using a magnetic stir bar. The bottles were then purged with nitrogen for 5 minutes, capped, and placed in front of a UV lamp (365 nm, ~1.5 mW/cm^2) to form a syrup having a viscosity of approximately 3000 cP at room temperature. An additional 0.16 phr Irg651 and 0.15 phr triazine were added to the syrup and the bottles were mixed on a roller mill in the dark until the solid ingredients were completely dissolved.

TABLE 2

Compositions of low $T_g$ acrylic syrups

| Syrup | 2EHA (phr) | 2-PHA (phr) | AA (phr) | IBOA (phr) | $T_g$* (° C.) |
|---|---|---|---|---|---|
| S-1 | 77.3 | — | 2.4 | 20.3 | −40 |
| S-2 | 97.5 | — | 2.5 | — | −60 |
| S-3 | 96.2 | — | 3.8 | — | −59 |
| S-4 | 76.3 | — | 3 | 20.7 | −38 |
| S-5 | — | 96.2 | 3.8 | — | −64 |

*Tg was calculated according to the Fox Equation

Examples 1-6 and Comparative Examples C1-C5

Pressure sensitive adhesive compositions, shown in Table 3 were prepared by combining low $T_g$ copolymer syrups with high Tg copolymers, additional IBOA monomers, and tackifiers in the amounts shown in Table 3 in amber glass bottles. The bottles were capped and mixed on a roller mill in the dark until the solid ingredients dissolved completely.

Pressure sensitive adhesive tapes were prepared by coating each composition between a 51 micron (2 mil) transparent release liner (CPFilms® T10 from Solutia Inc., St. Louis, Mo.) and a 51 micron polyester film backing (HOSTAPHAN 3SAB available from Mitsubishi Polyester Film, Inc., Greer, S.C.) using a 15.2 cm wide knife coater. The coater gap was set to provide a 51 micron thick adhesive coating on a tape. The adhesive layer was cured with ultraviolet light (365 nm, 1.5 mW/cm$^2$) for ten minutes, with the T10 release liner close to the light source. The tapes were stored at 23° C. and 50% relative humidity.

TABLE 3

Compositions Examples 1-6 and C1-C5

| Ex. | High Tg polymer Polymer | (phr) | Low Tg Syrup Syrup | (phr) | IBOA (phr) | R1094 (phr) | P140 (phr) | TP7042 (phr) |
|---|---|---|---|---|---|---|---|---|
| C1 | HTG-1 | 10.7 | S-2 | 79.3 | 10.0 | — | — | — |
| 1 | HTG-1 | 10.7 | S-2 | 79.3 | 10.0 | 10.0 | — | — |
| 2 | HTG-1 | 10.7 | S-2 | 79.3 | 10.0 | — | 5.0 | — |
| C2 | HTG-2 | 13.7 | S-3 | 72.6 | 13.7 | — | — | — |
| 3 | HTG-1 | 10.7 | S-2 | 79.3 | 10.0 | — | 7.5 | — |
| 4 | HTG-4 | 10.7 | S-2 | 79.3 | 10.0 | — | 7.5 | — |
| 5 | HTG-5 | 10.7 | S-2 | 79.3 | 10.0 | — | 7.5 | — |
| 6 | HTG-1 | 20.7 | S-2 | 79.3 | 0.0 | — | 5.0 | — |
| C3 | None | 0 | S-1 | 100.0 | — | — | — | — |
| C4 | LTG | 25.0 | S-4 | 75.0 | — | 10.0 | — | — |
| C-5 | HTG-3 | 10.7 | S-5 | 79.3 | 10.0 | — | — | 17.1 |

The tapes and adhesives were tested for 90° Peel Adhesion Strength after conditioning at conditions B or C. Samples were also tested for Static Shear Strength at 70° C. on a PP substrate. The results are summarized in Table 4.

TABLE 4

Performance and Properties of Adhesives and Tapes

| Ex. | Peel Adhesion (N/dm) @ B | Peel Adhesion (N/dm) @ C | Shear Strength (min) |
|---|---|---|---|
| C1 | 39 | 63 | 5,300 |
| 1 | 81 | 116 | 10,000+ |
| 2 | 66 | 107 | 10,000+ |
| *2 | 72 | NT | NT |
| C2 | 48 | 61 | 10,000+ |
| 3 | 74 | 114 | 10,000+ |
| 4 | 72 | 81 | 4,300 |
| 5 | 68 | 55 | 2,800 |
| C3 | 26 | 13 | 600 |
| C4 | 63 | 55 | 40 |
| C5 | 9 | 22 | NT |

*2—Adhesive film was Heat Aged before preparing the test specimen and testing.
NT—Not tested Comparative Example C6

Comparative Example C6 was a 51 micron tackified adhesive transfer tape sold commercially for room temperature adhesion to low energy substrates. Test specimens were prepared and tested for peel adhesion and static shear strength on PP after conditioning at condition A and results are shown in Table 5.

TABLE 5

Adhesive performance

| Ex. | 90° Peel Adhesion Force (N/dm) Room | 70° C. | 90° C. | 70° C. Static Shear (min) |
|---|---|---|---|---|
| 1 | 100 | 54 | 22 | 10,000+ |
| C2 | 76 | 68 | 38 | 10,000+ |
| 6 | 80 | 69 | 45 | 10,000+ |
| C6 | 110 | 12 | 2 | 100 |

Examples 7-9 and Comparative Examples C7-C8

A solution acrylic polymer was prepared by adding 86.5 grams of 2-EHA, 11.0 grams of IBOA, and 2.5 grams of acrylic acid to a bottle containing 100 grams of ethyl acetate and 0.25 grams of an azonitrile polymerization initiator (VAZO-67 obtained from DuPont; Wilmington, Del.). This mixture was purged with nitrogen to remove oxygen and the bottle was sealed and placed in a 60° C. water bath for 24 hours. The resulting polymer was a clear, viscous solution with a measured intrinsic viscosity (IV) of 0.87 dL/g and about 50% acrylic polymer solids.

Adhesive compositions were prepared by adding 10 phr high Tg acrylic copolymer, 0.1 phr B-212 chemical crosslinker, and tackifier (R1094 or M90) in the amounts shown in Table 6 to glass jars each containing approximately 90 phr acrylic solution polymer and approximately 90 phr ethyl acetate used in the solution polymerization process. Sufficient toluene was added to reduce the solids to about 33.2%. The jars were capped and mixed on a roller mill for 48 hours. Tapes were prepared by coating each solution on a 15.2 cm wide knife coater to provide a 51 micron dried adhesive coating on the treated side of the polyester film backing in Example 1. The coated adhesive was dried in an air-circulating oven set at 71° C. (160° F.) for 15 minutes. The adhesive side of the resulting tape was covered with a release liner.

Each tape was tested according to the 90° Angle Peel Adhesion Strength Test on PP at room temperature and elevated temperatures after conditioning at Condition A. The results are shown in Table 6.

TABLE 6

Compositions and performance for solution polymers

| Ex. | HTP polymer | R1094 (phr) | M90 (phr) | HTG M$_w$ (Daltons) | Peel Adhesion (N/dm) Room | 70° C. | 90° C. |
|---|---|---|---|---|---|---|---|
| 7 | HTG-6 | 10 | — | 40,100 | 97 | 73 | 25 |
| 8 | HTG-1 | 10 | — | 25,600 | 105 | 63 | 21 |
| 9 | HTG-1 | — | 10 | 25,600 | 71 | 42 | 19 |
| C7 | HTG-7 | 10 | — | 8,400 | 113 | 50 | 10 |
| C8 | HTG-7 | — | 10 | 8,400 | 65 | 20 | 7 |

Example 10

Example 10 contained the same low T$_g$ acrylic polymer as in Examples 7-9. A high T$_g$ acrylic copolymer was prepared by adding 97.0 grams of IBOA and 3.0 grams of acrylic acid to a bottle containing 300.0 grams of ethyl acetate and 0.5 grams of an azonitrile polymerization initiator (VAZO-67 obtained from DuPont; Wilmington, Del.). This mixture was purged with nitrogen to remove oxygen and the bottle was sealed and placed in a 65° C. water bath for 8 hours. Mw of the resulting polymer was measured at 91,700 Daltons.

The adhesive sample was prepared by mixing 90 phr low Tg polymer, 10 phr high Tg polymer, 7.5 phr P140, and 0.1 phr B-212 chemical crosslinker in a glass jars. Sufficient toluene was added to reduce the solid percent to about 25%. The adhesive tape was prepared following the same procedures as in Examples 7-10. Adhesive performances of the resulting tape are shown in Table 7.

TABLE 7

Adhesive performance

| | 90° Peel Adhesion Force (N/dm) | | | |
|---|---|---|---|---|
| Ex. | Room | 70° C. | 90° C. | 70° C. Static Shear (min) |
| 10 | 121 | 66 | 39 | 10,000+ |

This disclosure is illustrated by the following embodiments.
1. An adhesive composition comprising:
   a) 60 parts by weight or greater of a low $T_g$ (meth)acrylate copolymer component comprising
      i. $C_1$-$C_{18}$(meth)acrylic acid ester monomer units;
      ii. acid functional ethylenically unsaturated monomer units;
      iii. optionally non-acid functional, ethylenically unsaturated polar monomer units;
      iv. optionally vinyl monomer units; and
      v. optionally a multifunctional (meth)acrylate, and
   b) up to 40 parts by weight of a high $T_g$ acrylate copolymer having a Mw>20 k comprising:
      i) high $T_g$ (meth)acrylic acid ester monomer units;
      ii) optional acid functional ethylenically unsaturated monomer units;
      iii) optional low $T_g$ (meth)acrylic acid ester monomer units;
      iv) optional non-acid functional, ethylenically unsaturated polar monomer units;
      v) optional vinyl monomer units; and
   c) 0.1 to 20 parts be weight of a hydrogenated hydrocarbon tackifier, based on 100 parts by weight of a), and b)).
2. The adhesive composition of embodiment 1 wherein the low $T_g$ solute copolymer has a $T_g$ of <20° C.
3. The adhesive composition of embodiment 1 wherein the high $T_g$ (meth)acrylate copolymer has a $T_g$ of >50° C.
4. The adhesive composition of any of the previous embodiments wherein the low $T_g$ (meth)acrylate copolymer component comprises syrup copolymer comprising a solute low $T_g$ copolymer in solvent monomer(s).
5. The adhesive composition of embodiment 4 wherein the low $T_g$ solute copolymer comprises:
   i. 85 to 99.5 parts by weight of an (meth)acrylic acid ester;
   ii. 0.5 to 15 parts by weight of an acid functional ethylenically unsaturated monomer;
   iii. 0 to 10 parts by weight of a non-acid functional, ethylenically unsaturated polar monomer;
   iv. 0 to 5 parts vinyl monomer; and
   v. 0 to 5 parts of a multifunctional (meth)acrylate; based on 100 parts by weight total monomer.
6. The adhesive composition of embodiment 4 wherein the syrup copolymer comprises up to 30 parts by weight of the solute copolymer in solvent monomers.
7. The adhesive composition of embodiment 4 wherein the syrup copolymer a) has a viscosity of from 500 to 10,000 cPs at 22° C.
8. The adhesive composition of embodiment 4, wherein the a solvent monomer comprises a mixture of:
   i) an alkyl(meth)acrylate monomer;
   ii) an optional acid-functional ethylenically unsaturated monomer;
   iii) an optional non-acid functional polar monomer;
   iv) an optional vinyl monomer, and
   v) an optional multifunctional (meth)acrylate.
9. The adhesive composition of embodiment 1, wherein the low $T_g$ (meth)acrylate copolymer component a) comprises solution copolymer comprising a solute low $T_g$ copolymer in a solvent.
10. The adhesive composition of any of the previous embodiments, wherein the high $T_g$ monomer is selected from t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations thereof.
11. The adhesive composition of any of the previous embodiments further comprising d) a crosslinking agent.
12. The adhesive composition of embodiment 1 wherein the crosslinking agent is a triazine crosslinking agent.
13. The adhesive composition of any of the previous embodiments, wherein the (meth)acrylic acid ester monomer units of said low $T_g$ copolymer comprises acrylic esters of 2-octanol, citronellol, or dihydrocitronellol.
14. The adhesive composition of any of the previous embodiments, wherein the (meth)acrylic acid ester monomer units of said low $T_g$ copolymer comprises acrylic esters of 2-alkyl alkanols.
15. The adhesive composition of any of the previous embodiments, comprising) to 15 parts by weight of the hydrogenated hydrocarbon tackifer, relative to 100 parts of the low- and high-$T_g$ (co)polymer components.
16. The adhesive composition of any of the previous embodiments, comprising 2 to 10 parts by weight of the hydrogenated hydrocarbon tackifer, relative to 100 parts of the low- and high-$T_g$ (co)polymer components.
17. An adhesive article comprising a substrate and a coating of the adhesive of any of the previous embodiments on a surface thereof.
18. The adhesive article of embodiment 17 wherein the substrate is a low surface energy substrate.
19. The adhesive composition of any of embodiments 1-16 comprising:
   i. 65 to 98.5 parts by weight of an (meth)acrylic acid ester of non-tertiary alcohol;
   ii 1 to 20 parts by weight of high Tg (meth)acrylic acid ester monomers;
   iii. 0.5 to 15 parts by weight of an acid-functional ethylenically unsaturated monomer;
   iv. 0 to 10 parts by weight of a non-acid functional, ethylenically unsaturated polar monomer;
   v. 0 to 5 parts vinyl monomer; and
   vi. 0 to 5 parts of a multifunctional (meth)acrylate; based on 100 parts by weight total monomers of the low $T_g$ copolymer.

What is claimed is:
1. An adhesive composition comprising:
   a) 60 parts by weight or greater of a low $T_g$ (meth)acrylate solute copolymer component having a $T_g$ of <20° C. comprising i. $C_1$-$C_{18}$(meth)acrylic acid ester monomer units;
ii. acid functional ethylenically unsaturated monomer units;
iii. optionally non-acid functional, ethylenically unsaturated polar monomer units;
iv. optionally vinyl monomer units; and
v. optionally a multifunctional (meth)acrylate, and b) 5 to 40 parts by weight of a high $T_g$ (meth)acrylate copolymer having a $M_w \geq 30$ k and a $T_g$ of >50° C. comprising:
i. high $T_g$ (meth)acrylic acid ester monomer units;
ii) optional acid functional ethylenically unsaturated monomer units;
iii) optional low $T_g$ (meth)acrylic acid ester monomer units;
iv) optional non-acid functional, ethylenically unsaturated polar monomer units;
v) optional vinyl monomer units;
the sum of a) and b) being 100 parts by weight; and c) 0.1 to 20 parts be weight of a hydrogenated hydrocarbon tackifier, based on 100 parts by weight of a), and b);
wherein the tackifier is incompatible with a), and b).

2. The adhesive composition of claim 1 wherein the low $T_g$ (meth)acrylate copolymer component comprises syrup copolymer comprising a solute low $T_g$ copolymer in solvent monomer(s).

3. The adhesive composition of claim 2 wherein the low $T_g$ solute copolymer comprises:
i. 85 to 99.5 parts by weight of an (meth)acrylic acid ester;
ii. 0.5 to 15 parts by weight of an acid functional ethylenically unsaturated monomer;
iii. 0 to 10 parts by weight of a non-acid functional, ethylenically unsaturated polar monomer;
iv. 0 to 5 parts vinyl monomer; and
v. 0 to 5 parts of a multifunctional (meth)acrylate;
based on 100 parts by weight total monomer.

4. The adhesive composition of claim 2 wherein the syrup copolymer comprises up to 30 parts by weight of the solute copolymer in solvent monomers.

5. The adhesive composition of claim 2 wherein the syrup copolymer a) has a viscosity of from 500 to 10,000 cPs at 22° C.

6. The adhesive composition of claim 2, wherein the a solvent monomer comprises a mixture of:
i) an alkyl (meth)acrylate monomer;
ii) an optional acid-functional ethylenically unsaturated monomer;
iii) an optional non-acid functional polar monomer;
iv) an optional vinyl monomer, and
v) an optional multifunctional (meth)acrylate.

7. The adhesive composition of claim 1, wherein the low $T_g$ (meth)acrylate copolymer component a) comprises solution copolymer comprising a solute low $T_g$ copolymer in a solvent.

8. The adhesive composition of claim 1, wherein the high $T_g$ monomer is selected from t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations thereof.

9. The adhesive composition of claim 1 further comprising d) a crosslinking agent.

10. The adhesive composition of claim 1 wherein the crosslinking agent is a triazine crosslinking agent.

11. The adhesive composition of claim 1, wherein the (meth)acrylic acid ester monomer units of said low $T_g$ copolymer comprises acrylic esters of 2-octanol, citronellol, or dihydrocitronellol.

12. The adhesive composition of claim 1, wherein the (meth)acrylic acid ester monomer units of said low $T_g$ copolymer comprises acrylic esters of 2-alkyl alkanols.

13. The adhesive composition of claim 1, comprising 1 to 15 parts by weight of the hydrogenated hydrocarbon tackifer, relative to 100 parts of the low- and high- $T_g$ (co)polymer components.

14. The adhesive composition of claim 1, comprising 2 to 10 parts by weight of the hydrogenated hydrocarbon tackifer, relative to 100 parts of the low- and high- $T_g$ (co)polymer components.

15. An adhesive article comprising a substrate and a coating of the adhesive of claim 1 on a surface thereof.

16. The adhesive article of claim 15 wherein the substrate is a low surface energy substrate.

17. The adhesive composition of claim 1 wherein the low $T_g$ solute copolymer comprises:
ia. 65 to 98.5 parts by weight of an (meth)acrylic acid ester monomer;
ib. 1 to 20 parts by weight of high $T_g$ (meth)acrylic acid ester monomers;
ii. 0.5 to 15 parts by weight of an acid-functional ethylenically unsaturated monomer;
iii. 0 to 10 parts by weight of a non-acid functional, ethylenically unsaturated polar monomer;
iv. 0 to 5 parts vinyl monomer; and
v. 0 to 5 parts of a multifunctional (meth)acrylate;
based on 100 parts by weight total monomers of the low $T_g$ copolymer.

* * * * *